(12) United States Patent
Oshida (10) Patent No.: US 8,464,019 B2
(45) Date of Patent: Jun. 11, 2013

(54) APPARATUS FOR DYNAMICALLY MIGRATING LPARS WITH PASS-THROUGH I/O DEVICES, ITS METHOD, AND ITS PROGRAM

(75) Inventor: Hiroaki Oshida, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 12/749,017

(22) Filed: Mar. 29, 2010

(65) Prior Publication Data

US 2010/0250883 A1 Sep. 30, 2010

(30) Foreign Application Priority Data

Mar. 30, 2009 (JP) .................................. 2009-081859

(51) Int. Cl.
*G06F 12/02* (2006.01)
(52) U.S. Cl.
USPC .......................................................... 711/173
(58) Field of Classification Search
None
See application file for complete search history.

(56) References Cited

U.S. PATENT DOCUMENTS

2006/0294323 A1* 12/2006 Armstrong et al. ........... 711/153
2009/0119087 A1* 5/2009 Ang et al. ....................... 703/23

FOREIGN PATENT DOCUMENTS

| JP | 05-061803 A | 3/1993 |
|----|-------------|--------|
| JP | 2002215408 A | 8/2002 |
| JP | 2004234114 A | 8/2004 |
| JP | 2005-327279 A | 11/2005 |
| JP | 2006072591 A | 3/2006 |
| JP | 2006-222569 A | 8/2006 |
| JP | 2008140198 A | 6/2008 |
| JP | 2008-217302 A | 9/2008 |
| JP | 2010039685 A | 2/2010 |

OTHER PUBLICATIONS

Japanese Office Action for JP2009-081859 issued Apr. 21, 2011.

* cited by examiner

*Primary Examiner* — Duc Doan (57) ABSTRACT

A dynamic migration apparatus of a system logically divides hardware resources of a physical machine to configure a plurality of logical partitions using the pass-through I/O method and performs migration on the logical partitions. The apparatus makes a setting so that the same I/O device used in a migration source logical partition continues to be used in a migration destination logical partition when migration is performed.

10 Claims, 8 Drawing Sheets

98-1: CONFIGURATION MANAGEMENT TABLE

| LPAR# | PORT# | OUTBOUND RANGE INFORMATION |
|---|---|---|

FOR EACH SLOT #

98-2: MIGRATION INFORMATION TABLE

| M BIT | MIGRATION DESTINATION LPAR # | MIGRATION DESTINATION PORT # |
|---|---|---|

FOR EACH SLOT #

98-3: MIGRATION MANAGEMENT TABLE

| | | | |
|---|---|---|---|
| PAGE #0 | V BIT | MC BIT | CONTROL INFORMATION |
| PAGE #1 | V BIT | MC BIT | CONTROL INFORMATION |
| PAGE #2 | V BIT | MC BIT | CONTROL INFORMATION |
| ... | | | |
| PAGE #n-1 | V BIT | MC BIT | CONTROL INFORMATION |
| PAGE #n | V BIT | MC BIT | CONTROL INFORMATION |

FOR EACH LPAR #

98-4: MEMORY BASE TABLE

| MEMORY BASE ADDRESS | NUMBER OF MEMORY PAGES |
|---|---|

FOR EACH LPAR #

FIG. 8

# APPARATUS FOR DYNAMICALLY MIGRATING LPARS WITH PASS-THROUGH I/O DEVICES, ITS METHOD, AND ITS PROGRAM

This application is based upon and claims the benefit of priority from prior Japanese Patent Application No. 2009-081859, filed Mar. 30, 2009, the entire contents of which are incorporated herein.

TECHNICAL FIELD

The present invention relates to logically dividing hardware recourses of a computer to configure a plurality of logical partitions (hereinafter, referred to as "LPARs" where appropriate) and migrating the configured LPARs according to various conditions in operation (the use rates of the hardware resources, power consumption, and so on).

BACKGROUND ART

In computer system's logical partitioning (or virtualization) technologies, control software called hypervisor or virtual machine monitor (VMM), running in privileged mode, controls the physical hardware of the computer system.

The hypervisor exercises control so as to logically divide the hardware resources of the physical machine such as CPUs, memories, and I/O devices to configure a plurality of logical partitions on the computer system. In each of the logical partitions on the computer system, the hardware resources distributed can be used to run a virtual machine (including an operating system).

With the logical partitioning technologies, the I/O devices are controlled by a privileged device driver in the hypervisor in a centralized fashion. The device drivers included in each operating system therefore need to access the I/O devices through the privileged device driver when controlling the I/O devices. The presence of the processing through the privileged device driver causes a large overhead, so that the logical partitioning (or virtualization) environment has sometimes failed to provide satisfactory performance.

In view of the foregoing, there is now adopted a method in which the hypervisor only performs resource allocation management on the I/O devices, and the I/O devices are directly controlled by the device drivers that are included in the operating systems on the respective virtual machines (pass-through I/O method). The pass-through I/O method can be used to solve the foregoing problem that the I/O devices need to be accessed through the privileged device driver for I/O device control.

Meanwhile, there are technologies in which a plurality of physical machines are prepared and virtual machines are dynamically migrated (moved) within an identical physical server or between different physical servers. For example, a virtual machine can be migrated from a physical machine in a high load condition to one in a low load condition so that the physical machines are leveled out in the load condition (for example, see paragraph [0017] of PTL 1, paragraphs [0019] and [0020] of PTL 2, and so on).

{Citation List}
{Patent Literature}
{PTL 1} JP-A-2005-327279
{PTL 2} JP-A-2008-217302

SUMMARY OF INVENTION

Technical Problem

The migration under the I/O device control of the foregoing pass-through method, however, has the following problems.

A first problem is that with the pass-through I/O method, memory updates resulting from I/O accesses in the virtual machines are directly carried out by the I/O devices of the virtual machines, and the hypervisor is precluded from managing memory updates resulting from I/O accesses in the virtual machines. Consequently, it becomes difficult for the hypervisor to ensure memory consistency before and after migration of a virtual machine when the virtual machine is dynamically migrated within an identical physical server or between different physical servers. More specifically, dynamic migration involves performing a control so that the pass-through I/O devices on the virtual machine to be migrated are once disconnected from the virtual machine, the virtual machine is migrated in that state, and then the pass-through I/O devices disconnected are mounted on the virtual machine again after the execution of the migration. This results in operational limitations in the implementation of the dynamic migration. Another limitation is that if the system storage devices are I/O devices using the pass-through method, the nondetachability makes dynamic migration itself impracticable.

A second problem is that the prevalence of multi-core (many-core) processors has increased virtual machines in scale (configuration scale and the number of virtual machines). Virtual machines of large scales are often connected with a large number of pass-through I/O devices per virtual machine. With the migration of the virtual machines in view, the system construction will cost high to assign dedicated I/O devices of pass-through methods to each of the virtual machines (an enormous system is needed to cover the increased number of I/O slots required).

An exemplary object of the present invention is to provide an apparatus for dynamically migrating LPARs with pass-through I/O devices, its method, and its program which are capable of dynamic migration of LPARs that use the pass-through I/O method.

Solution to Problem

According to a first exemplary aspect of the present invention, there is provided a dynamic migration apparatus of a system that logically divides hardware resources of a physical machine to configure a plurality of logical partitions using a pass-through I/O method, and performs migration on the logical partitions, the dynamic migration apparatus making a setting so that the same I/O device used in a migration source logical partition continues to be used in a migration destination logical partition when migration is performed.

According to a second exemplary aspect of the present invention, there is provided a dynamic migration method of a system that logically divides hardware resources of a physical machine to configure a plurality of logical partitions using a pass-through I/O method, and performs migration on the logical partitions, the dynamic migration method including making a setting so that the same I/O device used in a migration source logical partition continues to be used in a migration destination logical partition when migration is performed.

According to a third exemplary aspect of the present invention, there is provided a computer-readable medium stored therein a dynamic migration program of a system that logically divides hardware resources of a physical machine to configure a plurality of logical partitions using a pass-through I/O method, and performs migration on the logical partitions, the dynamic migration program making a computer function as a dynamic migration apparatus that makes a setting so that the same I/O device used in a migration source logical partition continues to be used in a migration destination logical partition when migration is performed.

ADVANTAGEOUS EFFECTS OF INVENTION

An exemplary advantage according to the present invention is that a migration support unit having the foregoing operations can be implemented in an I/O controller of a computer system so as to cooperate with hypervisors. This makes it possible to perform dynamic migration of LPARs that use a pass-through I/O method.

DESCRIPTION OF EMBODIMENTS

Figure 1:
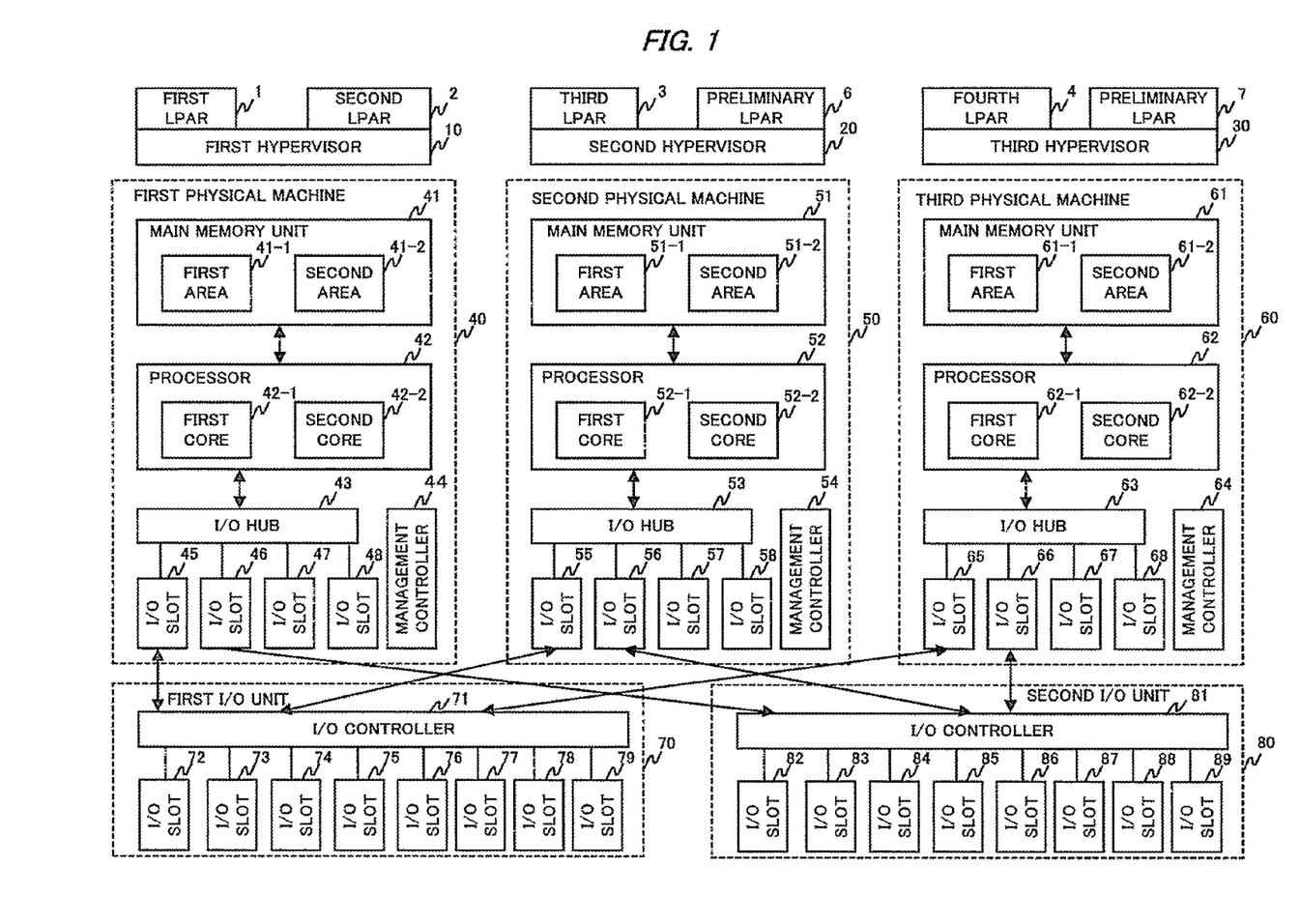
{FIG. 1} A block diagram showing the basic configuration of an exemplary embodiment of the present invention.

Next, an exemplary embodiment of the present invention will be described in detail with reference to the drawings. FIG. 1 shows an example of the computer system on which the present invention is predicated. In the computer system, hardware resources are logically divided by hypervisors to configure a plurality of LPARs.

A first physical machine 40 includes a main memory unit (MMU) 41, a processor (CPU: Central Processing Unit) 42, an I/O hub (IOH: Input Output Hub) 43, a management controller (BMC: Baseboard Management Controller) 44, and a group of I/O slots (I/O slots 45 to 48).

Similarly, a second physical machine 50 includes a main memory unit 51, a processor 52, an I/O hub 53, a management controller 54, and a group of I/O slots (I/O slots 55 to 58). Similarly, a third physical machine 60 includes a main memory unit 61, a processor 62, an I/O hub 63, a management controller 64, and a group of I/O slots (I/O slots 66 to 68). A first I/O unit 70 includes an I/O controller (IOC: Input Output Control) 71 and a group of I/O slots (I/O slots 72 to 79).

Similarly, a second I/O unit 80 includes an I/O controller 81 and a group of I/O slots (I/O slots 82 to 89).

The first physical machine 40, the second physical machine 50, and the third physical machine 60 are connected to the first I/O unit 70 through I/O adapters that are mounted on the I/O slots 45, 55, and 65, respectively. The first physical machine 40, the second physical machine 50, and the third physical machine 60 are also connected to the second I/O unit 80 through I/O adapters that are mounted on the I/O slots 46, 56, and 66.

For ease of explanation, it will be assumed in the following description that the main memory units 41, 51, and 61 of the first physical machine 40, the second physical machine 50, and the third physical machine 60 have two memory areas each (a first area 41-1 and a second area 41-2, a first area 51-1 and a second area 51-2, or a first area 61-1 and a second area 61-2).

The processors 42, 52, and 62 of the first physical machine 40, the second physical machine 50, and the third physical machine 60 have two processor cores each (a first core 42-1 and a second core 42-2, a first core 52-1 and a second core 52-2, or a first core 62-1 and a second core 62-2). While the number of processor cores here is assumed to be two for ease of explanation, the applicable number of processor cores is not limited by the exemplary embodiment. The exemplary embodiment may use processors having any arbitrary numbers of cores. For example, quad-core products of Intel Core i7 from Intel Corporation are capable of processing up to eight threads simultaneously. Such CPUs may be employed.

The number of physical machines, the number of I/O units, the numbers of I/O slots, and the like are not limited, either. Arbitrary numbers may be selected.

Pieces of control software called a first hypervisor 10, a second hypervisor 20, and a third hypervisor 30 run on the first physical machine 40, the second physical machine 50, and the third physical machine 60, respectively. The hypervisors logically divide the hardware resources of the respective physical machines to create a plurality of LPARs.

In FIG. 1, the first hypervisor 10, the second hypervisor 20, and the third hypervisor 30 create a first LPAR 1 and a second LPAR 2, a third LPAR 3 and a preliminary LPAR 6, and a fourth LPAR 4 and a preliminary LPAR 7, respectively. In each LPAR, an independent operating system individually runs to create a virtual machine.

Figure 2:
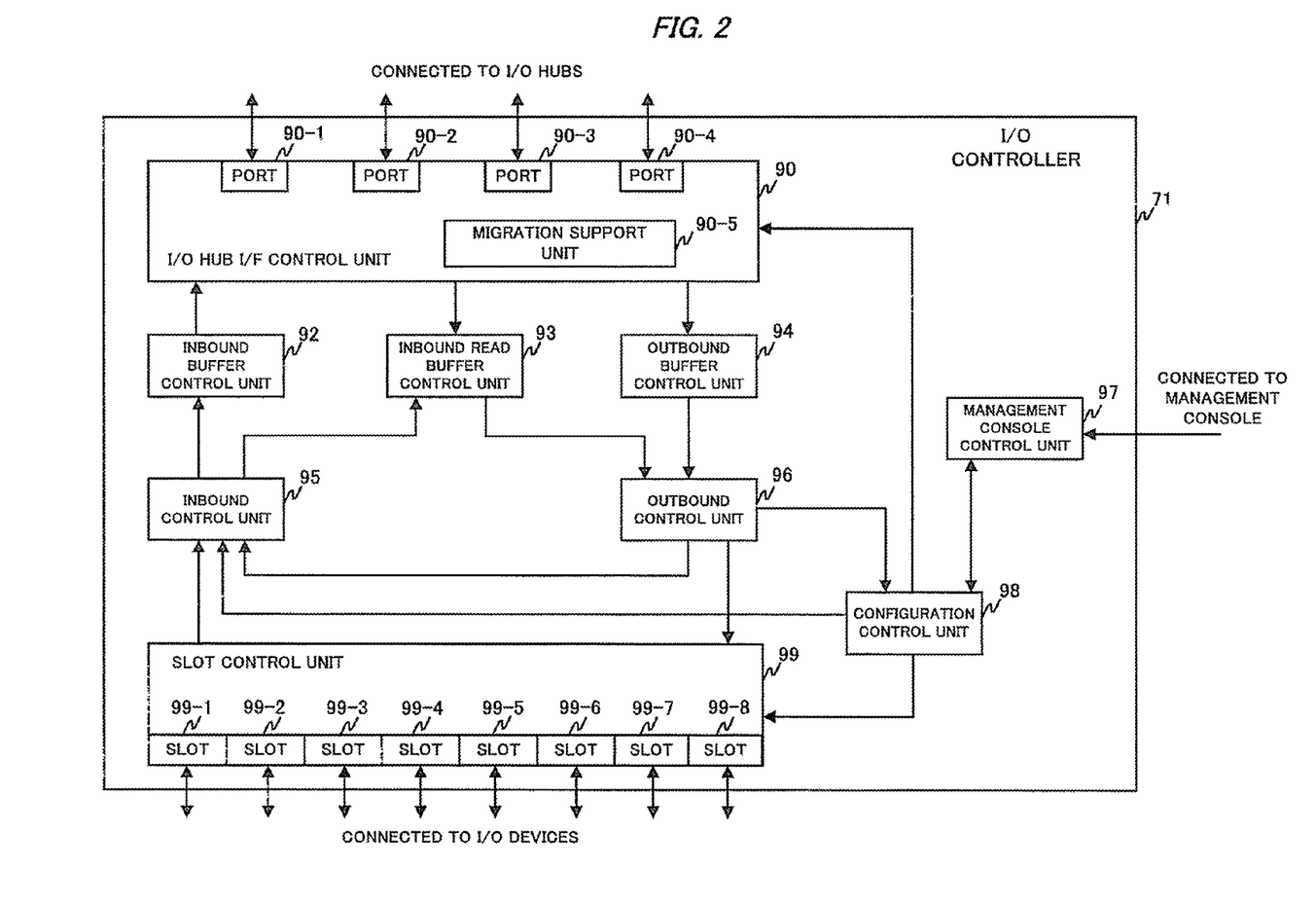
{FIG. 2} A block diagram showing the basic configuration of an I/O controller according to the exemplary embodiment of the present invention.

FIG. 2 is a diagram for explaining the detailed configuration of the I/O controller 71 in FIG. 1. Since the I/O controller 81 has the same configuration, description of the I/O controller 81 will be omitted. Initially, an overview of the I/O controller according to the exemplary embodiment will be given.

The I/O controller of the exemplary embodiment is structured so that the I/O controller can be accessed from each individual LPAR configured on the system. The I/O controller has a configuration management table, a memory base table, a migration management table, and a migration support unit. The configuration management table shows various information as to which LPAR each I/O slot of the I/O controller is configured in. The memory base table shows the memory space to be used by each LPAR. The migration management table manages and retains the state of data transfer and the like during migration in units of memory pages. The migration support unit transfers data from the memory of a migration source LPAR to that of a migration destination LPAR. In consideration of I/O device redundancy in the LPARs, a configuration of multiplexing I/O devices under different I/O controllers (primary-secondary duplex configuration etc.) may be employed.

The management controllers of the three physical machines and management console control units of the two I/O controllers are connected to a management console (not shown). The management console is an independent processing system from which a system administrator can execute various functions including the distribution of resources to individual LPARs as well as activation.

Next, detailed description will be given with reference to FIG. 2.

The I/O controller 71 includes an I/O hub I/F control unit 90, a migration support unit 90-5, an outbound buffer control unit 94, an inbound read buffer control unit 93, an inbound buffer control unit 92, an outbound control unit 96, a management console control unit 97, an inbound control unit 95, a configuration control unit 98, and a slot control unit 99.

The I/O hub I/F control unit 90 has a control function of receiving transactions from each I/O hub and routing the transactions to appropriate storage locations in the I/O controller depending on the transaction type. The I/O hub I/F control unit 90 also has an I/F to the inbound buffer control unit 92 to be described later, and has a control function of sending transactions from the inbound buffer control unit 92 to each I/O hub (I/O hubs 43, 53, and 63). The I/O hub I/F control unit 90 further includes the migration support unit 90-5, and has the function of referring to information on various tables retained in the configuration control unit 98 to be described later and transferring memory data used in a migration source LPAR to the memory area of a migration destination LPAR.

The outbound buffer control unit 94 has an I/F to the I/O hub I/F control unit 90, and receives an outbound request transaction from the I/O hub I/F control unit 90. The outbound buffer control unit 94 stores the received transaction into its own buffer 94-1 (not shown).

The outbound buffer control unit 94 also has an I/F to the outbound control unit 96 to be described later. The outbound buffer control unit 94 has a control function of buffering transactions and transmitting the transactions stored in the buffer 94-1 to the outbound control unit 96.

The inbound buffer control unit 92 has an I/F to the inbound control unit 95 to be described later, and receives an outbound reply transaction and an inbound write request transaction.

The inbound buffer control unit 92 also has an I/F to the inbound read buffer control unit 93 to be described later, and receives an inbound read request transaction from the inbound read buffer control unit 93. The inbound buffer control unit 92 has a buffer 92-1 (not shown) for storing received transactions. The inbound buffer control unit 92 also has an I/F to the I/O hub I/F control unit 90, and has a control function of transmitting the received transactions to the I/O hub I/F control unit 90.

The inbound read buffer control unit 93 has an I/F to the I/O hub I/F control unit 90, and receives an inbound read reply transaction (read data from a main memory unit) from the I/O hub I/F control unit 90. The inbound read buffer control unit 93 has a buffer 93-1 (not shown) for storing received transactions.

The inbound read buffer control unit 93 also has the function of checking whether or not all data that is requested by an inbound read request transaction is ready in the buffer 93-1, and a control function of reading the data from the buffer 93-1 and transmitting the data to the outbound control unit 96 if the data is ready.

The slot control unit 99 has I/Fs to the outbound control unit 96, the inbound control unit 95, and the group of I/O devices to be described later, and has the function of controlling I/Fs with I/O devices in connection according to protocols for the I/O devices.

The outbound control unit 96 has I/Fs to the outbound buffer control unit 94, the inbound read buffer control unit 93, and the slot control unit 99, as well as the inbound control unit 95 and the configuration control unit 98 to be described later. The outbound control unit 96 also has the function of routing transactions received from the outbound buffer control unit 94 or the inbound read buffer control unit 93 to the slot control unit 99, the inbound control unit 95, and the configuration control unit 98.

The routing destination is determined by the transaction type. Specifically, a configuration request transaction destined to the I/O controller itself, received from the outbound buffer control unit 94, is transmitted to the configuration control unit 98. An inbound read reply transaction received from the inbound read buffer control unit 93 is transmitted to the slot control unit 99. An outbound request transaction received from the outbound buffer control unit 94 is transmitted to the slot control unit 99.

The inbound control unit 95 has I/Fs to the inbound buffer control unit 92, the inbound read buffer control unit 93, the slot control unit 99, and the outbound control unit 96, as well as the configuration control unit 98 to be described later. The inbound control unit 95 also has the function of routing transactions received from the slot control unit 99, the outbound control unit 96, and the configuration control unit 98 to the inbound buffer control unit 92 or the inbound read buffer control unit 93.

The routing destination is determined by the transaction type. Specifically, a configuration reply transaction received from the configuration control unit 98, outbound reply transactions received from the slot control unit 99 and the outbound control unit 96, and an inbound write request transaction received from the slot control unit 99 are transmitted to the inbound buffer control unit 92. An inbound read request transaction received from the slot control unit 99 is transmitted to the inbound read buffer control unit 93.

Figure 3:
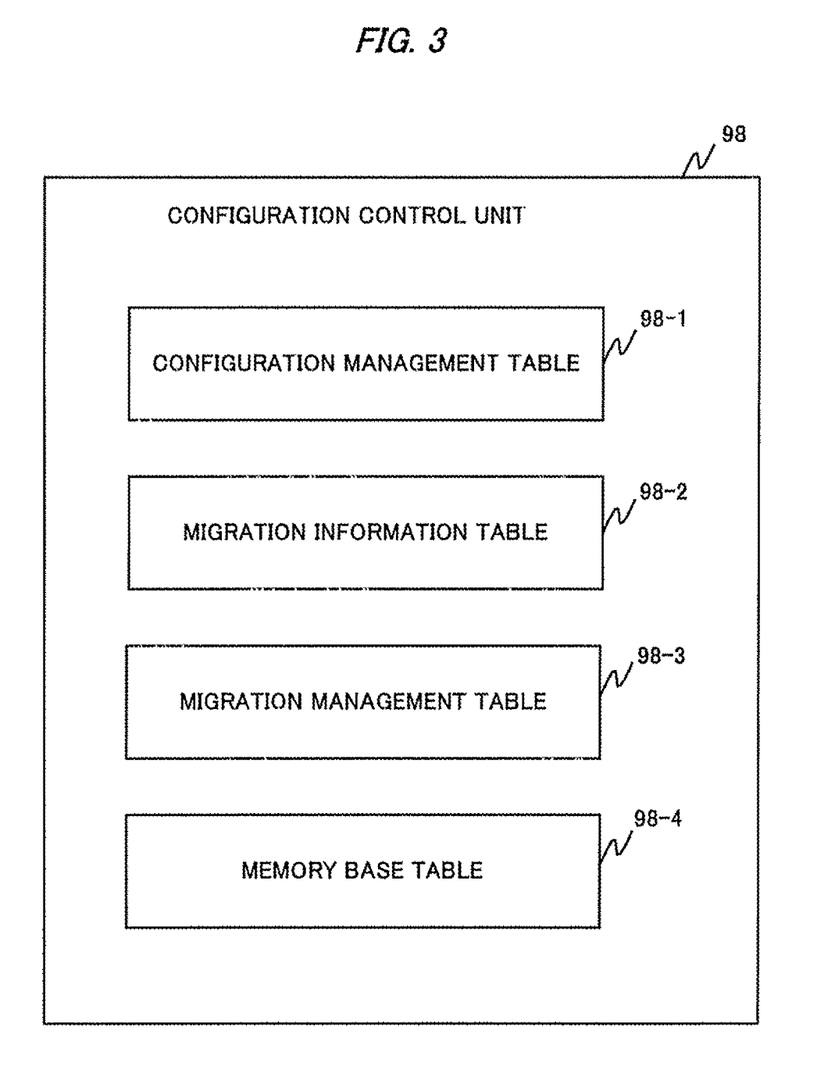
{FIG. 3} A diagram showing the basic configuration of a configuration control unit 98 according to the exemplary embodiment of the present invention.

Next, the configuration control unit 98 will be described with reference to FIG. 3. The configuration control unit 98 has various configuration registers, which include a configuration management table 98-1, a migration information table 98-2, a migration management table 98-3, and a memory base table 98-4.

The configuration control unit 98 also has I/Fs to the outbound control unit 96 and the inbound control unit 95. The configuration control unit 98 updates the configuration registers according to a request transaction received from the outbound control unit 96, and transmits a reply transaction to the inbound control unit 95 when needed. Information on the configuration management table 98-1, the migration information table 98-2, the migration management table 98-3, and the memory base table 98-4 is distributed to the I/O hub I/F control unit 90 and the slot control unit 99.

Figure 4:
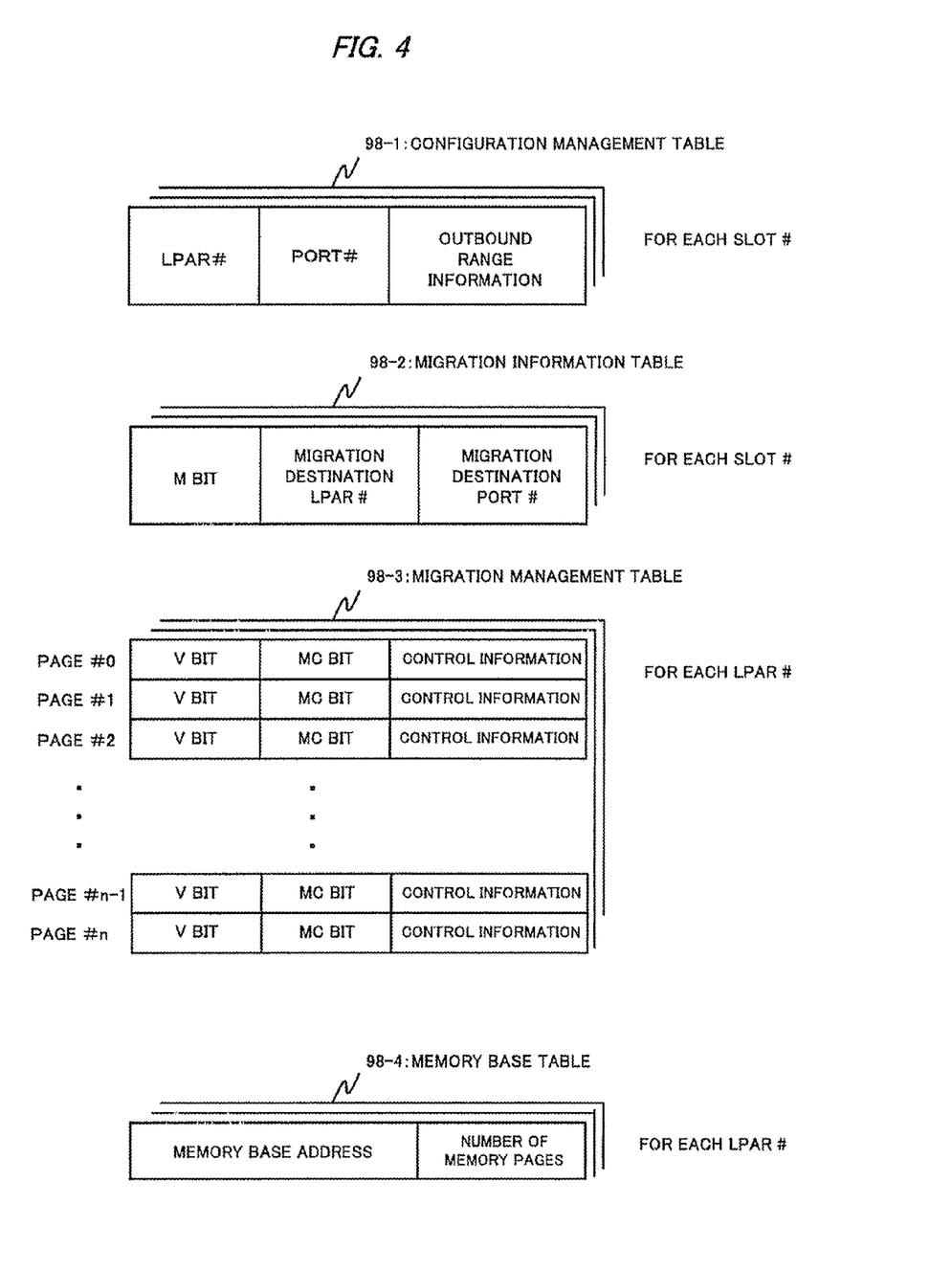
{FIG. 4} A diagram for explaining tables the configuration control unit 98 according to the exemplary embodiment of the present invention has.

The management console control unit 97 has an IF to the management console which is externally connected, and an I/F to the configuration control unit 98. The management console control unit 97 has the function of relaying update and reference controls on various groups of registers in the configuration control unit 98 according to instructions from the management console externally connected. FIG. 4 is a diagram for explaining the configuration of the configuration management table 98-1, the migration information table 98-2, the migration management table 98-3, and the memory base table 98-4 of the configuration control unit 98 shown in FIG. 3.

Referring to FIG. 4, the configuration management table 98-1 is a table that shows configuration information on the I/O slots of the I/O controller. This configuration management table 98-1 contains LPAR #, PORT #, and outbound range information. The LPAR # and PORT # indicate which LPAR number each I/O slot of the I/O controller belongs to and which I/O hub IF port of the I/O hub I/F control unit 90 the I/O slot is connected through. The outbound range information is range information on the outbound transaction that is assigned to the I/O slot. The outbound range information is used to distribute outbound transactions received from the I/O hubs, upper units, to corresponding slots.

The migration information table 98-2 contains an M bit (migration-in-process bit), migration destination LPAR #, and migration destination PORT #. The migration destination LPAR # indicates which LPAR number to migrate the corresponding logical partition to. The migration destination PORT # indicates which I/O hub I/F port of the I/O hub I/F control unit 90 is connected to the migration destination physical machine.

The migration management table 98-3 is a table that manages and retains the state of data transfer and the like of memory data that a LPAR has when the LPAR is under migration, in units of memory pages (entries). This migration management table 98-3 contains a V bit (entry valid bit), an MC bit (migration complete bit), and control information (readability/writability attributes of the corresponding page).

The memory base table 98-4 is a table that shows memory information on the memory space for each LPAR to use on the upper-unit side. The memory base table 98-4 includes memory base addresses and the numbers of memory pages. The memory base addresses and the numbers of memory pages are used when I/O devices make a memory access and when the migration support unit 90-5 performs data transfer processing.

{Description of Operation of Exemplary Embodiment}

The operation of the exemplary embodiment of the present invention will be described with reference to the drawings.

In the following description, four LPARs will initially be configured under the control of control software (hypervisor) that runs in privileged mode on each physical machine shown in FIG. 1.

Figure 5:
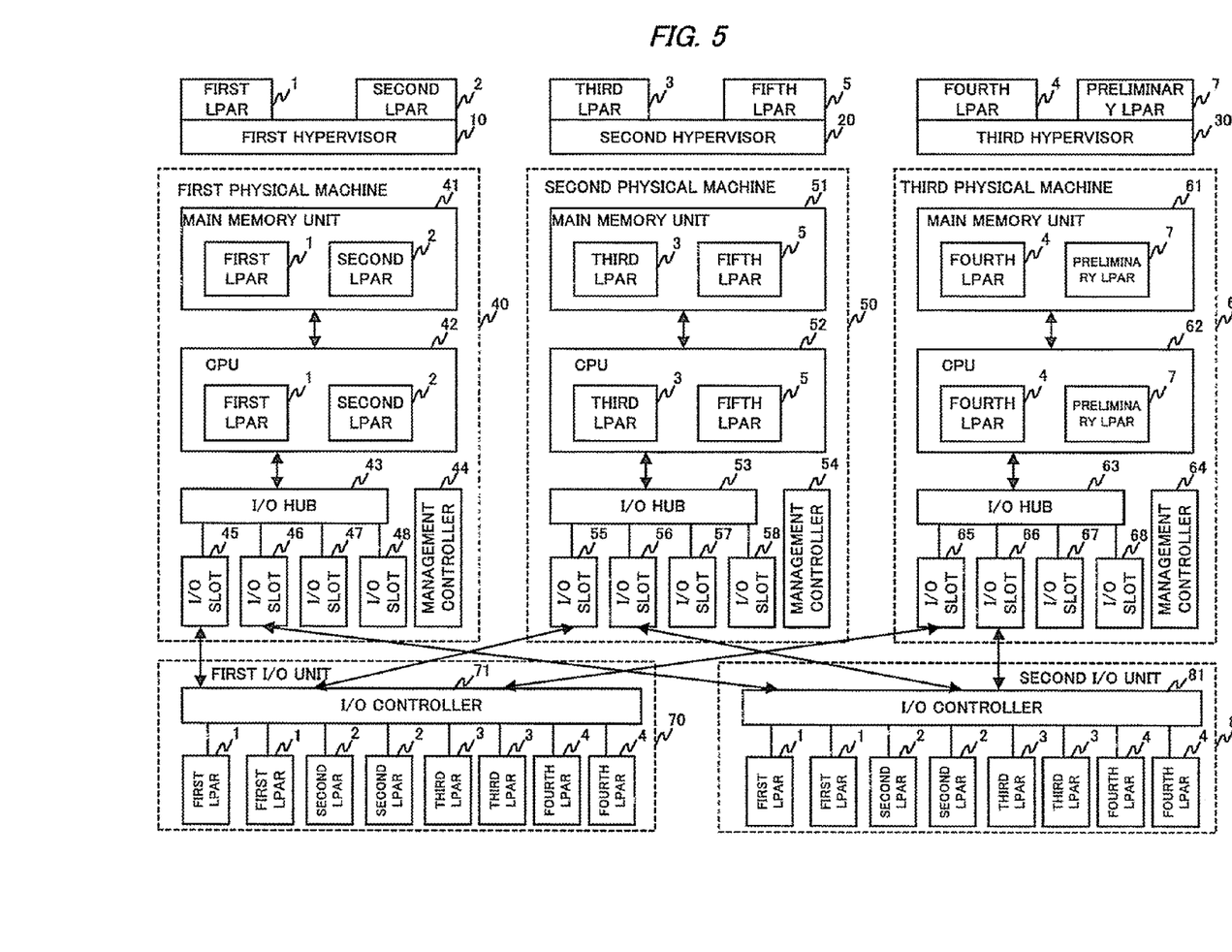
{FIG. 5} A diagram showing resource allocations for LPARs according to the exemplary embodiment of the present invention.

Specifically, as shown in FIG. 5, the first core 42-1 and the main memory unit 41-1 on the first physical machine 40, the I/O slots 72 and 73 of the first I/O unit 70, and the I/O slots 82 and 83 of the second I/O unit 80 are allocated to the first LPAR 1 as occupied resources.

Similarly, the second core 42-2 and the main memory unit 41-2 on the first physical machine 40, the I/O slots 74 and 75 of the first I/O unit 70, and the I/O slots 84 and 85 of the second I/O unit 80 are allocated to the second LPAR 2 as occupied resources.

Similarly, the first core 52-1 and the main memory unit 51-1 on the second physical machine 50, the I/O slots 76 and 77 of the first I/O unit 70, and the I/O slots 86 and 87 of the second I/O unit 80 are allocated to the third LPAR 3 as occupied resources.

Similarly, the first core 62-1 and the main memory unit 61-1 on the third physical machine 60, the I/O slots 78 and 79 of the first I/O unit 70, and the I/O slots 88 and 89 of the second I/O unit 80 are allocated to the fourth LPAR 4 as occupied resources.

As mentioned above, this state is where I/O devices are multiplexed under different I/O controllers in view of I/O device redundancy in the LPARs. That is, each LPAR uses the devices connected to the first I/O unit 70 as primary devices and the devices connected to the second I/O unit 80 as secondary devices for multiplexing.

In the circumstances, the operating systems run on the respective LPARs under the control of the hypervisors, using the hardware resources allocated to the LPARs as occupied resources. Here, the operating systems, and applications and device drivers running on the operating systems, can only access the hardware resources that are allocated to their own LPARs.

With the occupied I/O slots allocated, each logical partition uses the method of directly controlling the I/O devices mounted on the I/O slots from its operating system and device drivers (pass-through I/O method). In the pass-through I/O method, the operating system and device drivers running in each logical partition make direct control (the hypervisor is only involved in the division of the I/O slot resources and not in the control of the I/O devices such as emulation), so that the I/O devices can be accessed at high speed. The three physical machines and the two I/O controllers are connected to the management console. The management console is an independent processing system from which the system administrator can execute various functions including the distribution of resources to individual LPARs as well as activation.

Description will now be given of the operation for migrating the configured LPARs according to various conditions in operation (the use rates of the hardware resources, power consumption, and so on).

As a precondition for the operation of the exemplary embodiment, the system administrator initially checks the management console for the current operating states of the logical partitions. Specifically, the system administrator checks the processor use rates and power consumption of the respective physical machines, and determines if any logical partition needs to be migrated.

Figure 6:
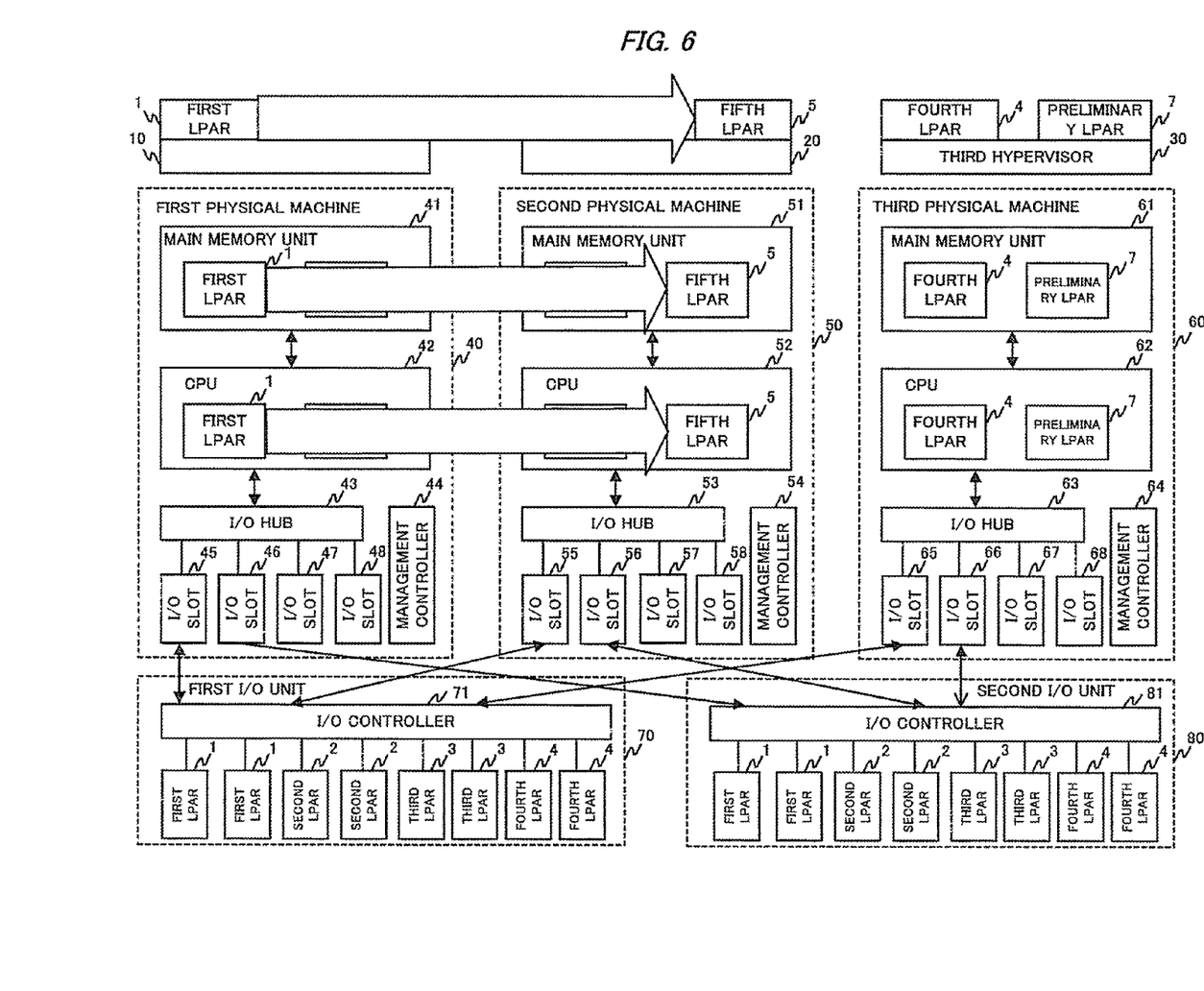
{FIG. 6} A diagram showing LPAR migration according to the exemplary embodiment of the present invention.

Suppose, for example, that it is recognized that both the processors of the first LPAR 1 and the second LPAR 2 running on the first physical machine 40 have high use rates and the processor power of the first physical machine 40 is intensively used (high load condition). Assume also that it is determined to migrate the first LPAR 1 to preliminary hardware resources of the second physical machine 50 which is in a low load condition. FIG. 6 shows the migration image.

The system administrator gives an instruction through the management console to request that the hypervisor of the migration destination reserve hardware resources (a processor, a main memory unit, and I/O slots) that are needed for the migration destination logical partition.

In FIG. 5, the second core 52-2 and the main memory unit 51-2 are assigned as hardware resources of the migration destination. For I/O slots, the I/O slots of the migration source first LPAR 1 (the devices connected to the slots) continue to be used. In the diagrams, the first LPAR 1 after the migration will be referred to as "fifth LPAR 5" on the second physical machine 50. In the first I/O unit 70 and the second I/O unit 80, the migrated LPAR is maintained as "first LPAR 1."

After the reservation of the hardware resources needed for the migration is completed, the system administrator instructs the first hypervisor 10 and the second hypervisor 20 through the management console to execute dynamic migration from the migration source first LPAR 1 to the migration destination fifth LPAR 5.

Figure 7:
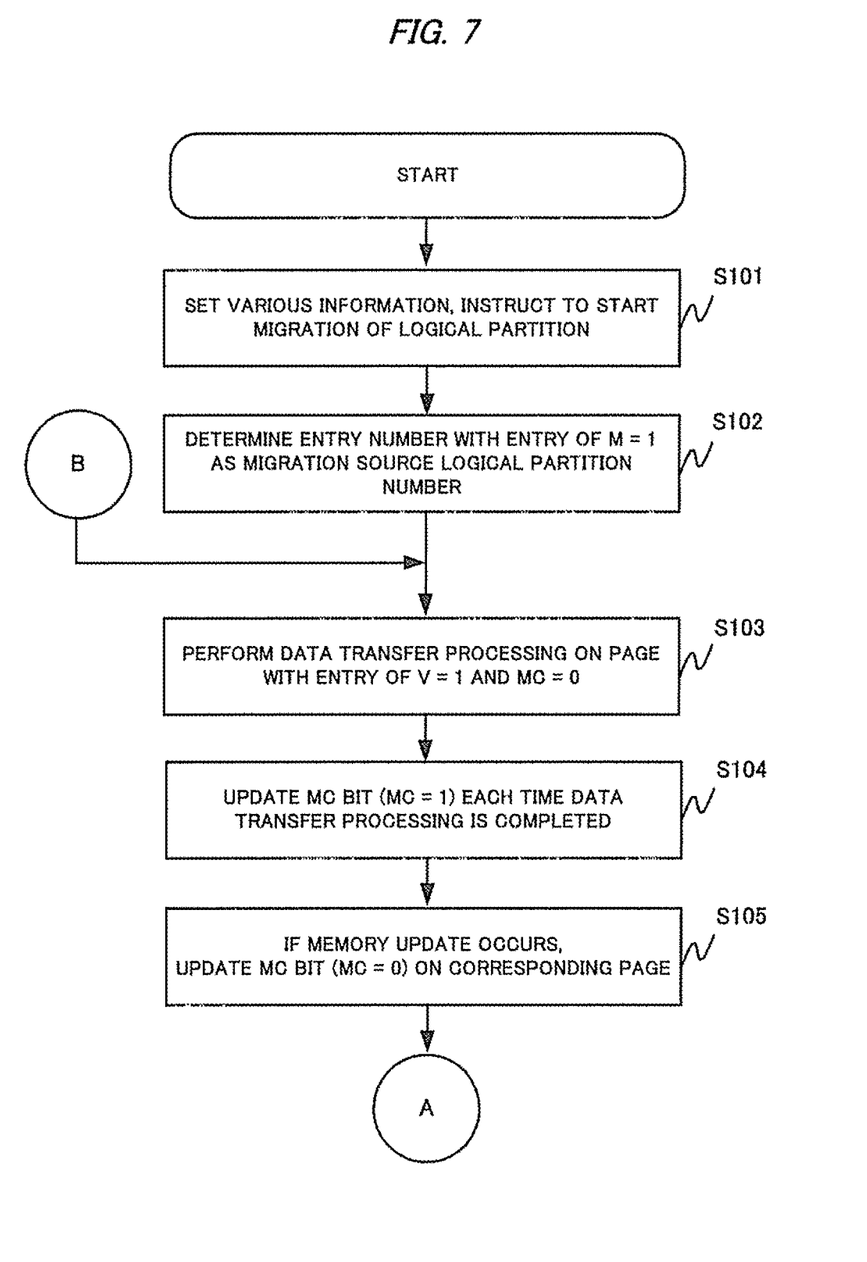
{FIG. 7} A flowchart (1/2) showing the basic operation of the exemplary embodiment of the present invention.
Figure 8:
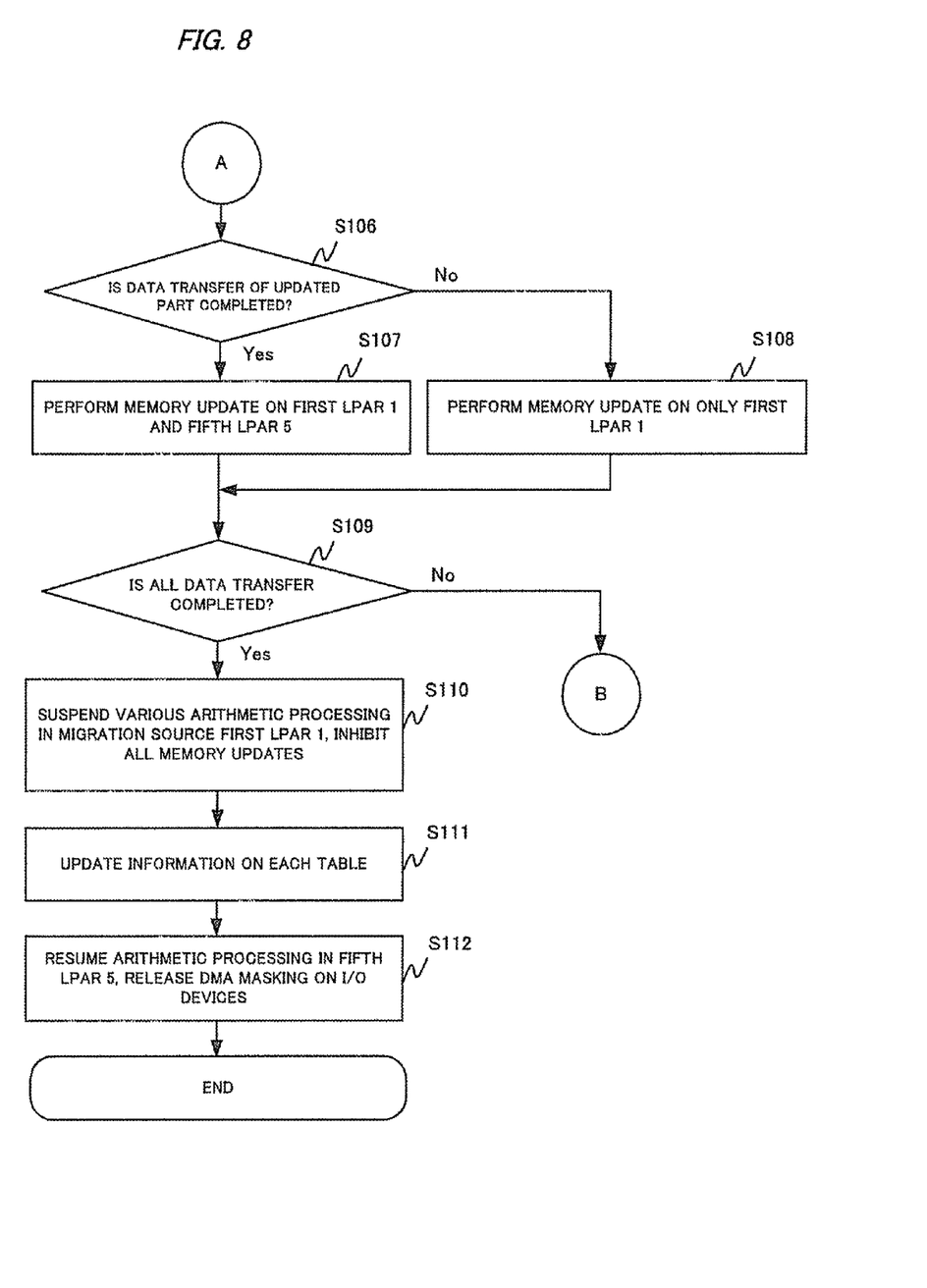
{FIG. 8} A flowchart (2/2) showing the basic operation of the exemplary embodiment of the present invention.

Next, the operation of the exemplary embodiment will be described with reference to FIGS. 7 and 8.

The first hypervisor 10 and the second hypervisor 20 set various information on the configuration management table 98-1, the migration information table 98-2, the migration management table 98-3, and the memory base table 98-4 of the I/O controller according to a migration execution instruction from the management console. The first and second hypervisors 10 and 20 then instruct the migration support unit 90-5 to start the migration of the logical partition (step S101).

Receiving the instruction, the migration support unit 90-5 refers to the information on the configuration management table 98-1, the migration information table 98-2, the migration management table 98-3, and the memory base table 98-4, and performs data transfer processing to transfer memory data from the main memory unit 41-1 of the migration source first LPAR 1 to the main memory unit 51-2 of the migration destination fifth LPAR 5 in units of pages.

Initially, the migration support unit 90-5 determines the number of an entry that has an M bit of M=1 in the migration information table 98-2 to be the migration source logical partition number (step S102).

The migration support unit 90-5 searches the migration management table 98-3 for entries that are designated by the migration source logical partition number, and performs the data transfer processing on the page of an entry that has a V bit and an MC bit of V=1 and MC=0 (step S103). The data transfer addresses to be used in the data transfer processing at this step are obtained by adding a page offset to the memory base addresses corresponding to the migration source logical partition number and the migration destination logical partition number in the memory base table 98-4. In the present case, the sum of the memory base address shown for the migration source first LPAR 1 and the page offset is used as the data transfer source address. The sum of the memory base address shown for the migration destination fifth LPAR 5 and the page offset is used as the data transfer destination address.

Each time the page-based data transfer processing is completed, the migration support unit 90-5 updates the MC bit (MC=1) of the corresponding page in the migration management table 98-3 (step S104).

When a memory update occurs in the migration source first LPAR 1 during the migration processing, the first hypervisor 10 updates the MC bit (MC=0) of the corresponding page in the migration management table 98-3 so that the migration support unit 90-5 performs the data transfer processing again (step S105).

When an I/O device causes a memory update during the migration processing, the I/O hub I/F control unit 90 of the I/O controller refers to the MC bit in the migration management table 98-3. If the data transfer is already completed (MC=1) (Yes at step S106), the I/O hub I/F control unit 90 performs the memory update both on the migration source first LPAR 1 and the migration destination fifth LPAR 5 (step S107).

On the other hand, if the data transfer is not completed yet (MC=0) (No at step S106), the I/O hub I/F control unit 90 performs the memory update only on the migration source first LPAR 1 (step S108).

The first hypervisor 10 monitors the state of data transfer by the migration support unit 90-5, and checks whether or not the transfer of all the memory information from the migration source first LPAR 1 to the migration destination fifth LPAR 5 is completed (step S109).

After the completion of the transfer (Yes at step S109), various arithmetic processing in the migration source first LPAR 1 is suspended and DMAs (Direct Memory Accesses) from the subordinate I/O devices are masked to temporarily inhibit all memory updates in the migration source first LPAR 1 (step S110).

The first hypervisor 10 then updates the information on the configuration management table 98-1, the migration information table 98-2, the migration management table 98-3, and the memory base table 98-4 according to the state after migration (step S111).

Subsequently, CPU context information and the like on the migration source first LPAR 1 are transferred from the LPAR to the migration destination fifth LPAR 5 through the I/O controller. The arithmetic processing using the CPU context information and the like is resumed in the migration destination fifth LPAR 5, and the masking of the I/O device DMAs is released to complete the migration processing (step S112).

The exemplary embodiment of the present invention described so far provides the following effects.

A first effect is that the migration support units having the foregoing operations are implemented in the I/O controllers of the computer system so as to cooperate with the hypervisors. This makes it possible to perform dynamic migration of the LPARs that use the pass-through I/O method.

A second effect is that when the LPARs are migrated, the I/O devices used before migration can continue to be used after migration. This can suppress excessive hardware resource investment on I/O devices.

It should be noted that each individual physical machine and I/O unit of the exemplary embodiment of the present invention may be implemented by hardware, software, or a combination of these.

The foregoing exemplary embodiment is a preferred exemplary embodiment of the present invention. The scope of the present invention is not limited to the exemplary embodiment, and the present invention may be practiced with various modifications without departing from the gist of the invention.

The whole of part of the exemplary embodiments disclosed above can be described as, but not limited to, the following supplementary notes.

(Supplementary note 1) A dynamic migration apparatus of a system that logically divides hardware resources of a physical machine to configure a plurality of logical partitions using a pass-through I/O method, and performs migration on the logical partitions, the dynamic migration apparatus making a setting so that the same I/O device used in a migration source logical partition continues to be used in a migration destination logical partition when migration is performed.

(Supplementary note 2) The dynamic migration apparatus according to Supplementary note 1, comprising: a management console control unit that accepts an execution instruction for migration after a hardware resource to be the migration destination is reserved on the physical machine by a virtual machine; a configuration control unit that instructs a migration support unit to start migration in response to the acceptance of the execution instruction; and the migration support unit that transfers data of a main memory unit of the migration source to a main memory unit of the migration destination based on the instruction of the configuration control unit, and after the transfer of all the data of the main memory unit of the migration source is completed, suspends arithmetic processing in the migration source, masks a DMA (Direct Memory Access) from a subordinate I/O device, and updates information the configuration control unit has, and after the update, releases the masking and makes the arithmetic processing resumed in the migration destination, the information pertaining to correspondence between the logical partitions and the I/O device.

(Supplementary note 3) The dynamic migration apparatus according to Supplementary note 1 or 2, wherein the migration source and the migration destination lie on different physical machines.

(Supplementary note 4) The dynamic migration apparatus according to any one of Supplementary notes 1 to 3, wherein a plurality of I/O devices are prepared for the one logical partition to be migrated, whereby the I/O devices are made redundant.

(Supplementary note 5) A computer system comprising a physical machine and the dynamic migration apparatus according to any one of Supplementary notes 1 to 4, the dynamic migration apparatus being connected to the physical machine, the dynamic migration apparatus being used to perform the migration.

(Supplementary note 6) A dynamic migration method of a system that logically divides hardware resources of a physical machine to configure a plurality of logical partitions using a pass-through I/O method, and performs migration on the logical partitions, the dynamic migration method including making a setting so that the same I/O device used in a migration source logical partition continues to be used in a migration destination logical partition when migration is performed.

(Supplementary note 7) The dynamic migration method according to Supplementary note 6, comprising: a management console control step of accepting an execution instruction for migration after a hardware resource to be the migration destination is reserved on the physical machine by a virtual machine; a step of preparing a configuration control unit for giving an instruction to start migration in a migration support step in response to the acceptance of the execution instruction; and the migration support step of transferring data of a main memory unit of the migration source to a main memory unit of the migration destination based on the instruction of the configuration control unit, and after the transfer of all the data of the main memory unit of the migration source is completed, suspending arithmetic processing in the migration source, masking a DMA from a subordinate I/O device, and updating information the configuration control unit has, and after the update, releasing the masking and making the arithmetic processing resumed in the migration destination, the information pertaining to correspondence between the logical partitions and the I/O device.

(Supplementary note 8) The dynamic migration method according to Supplementary note 6 or 7, wherein the migration source and the migration destination lie on different physical machines.

(Supplementary note 9) The dynamic migration method according to any one of Supplementary notes 6 to 8, wherein a plurality of I/O devices are prepared for the one logical partition to be migrated, whereby the I/O devices are made redundant.

(Supplementary note 10) A computer-readable medium stored therein a dynamic migration program of a system that logically divides hardware resources of a physical machine to configure a plurality of logical partitions using a pass-through I/O method, and performs migration on the logical partitions, the dynamic migration program making a computer function as a dynamic migration apparatus that makes a setting so that the same I/O device used in a migration source logical partition continues to be used in a migration destination logical partition when migration is performed.

(Supplementary note 11) The computer-readable medium according to Supplementary note 10, wherein the dynamic migration apparatus includes: a management console control unit that accepts an execution instruction for migration after a hardware resource to be the migration destination is reserved on the physical machine by a virtual machine; a configuration control unit that instructs a migration support unit to start migration in response to the acceptance of the execution instruction; and the migration support unit that transfers data of a main memory unit of the migration source to a main memory unit of the migration destination based on the instruction of the configuration control unit, and after the transfer of all the data of the main memory unit of the migration source is completed, suspends arithmetic processing in the migration source, masks a DMA from a subordinate I/O device, and updating information the configuration control unit has, and after the update, releases the masking and makes the arithmetic processing resumed in the migration destination, the information pertaining to correspondence between the logical partitions and the I/O device.

(Supplementary note 12) The computer-readable medium according to Supplementary note 10 or 11, wherein the migration source and the migration destination lie on different physical machines.

(Supplementary note 13) The computer-readable medium according to any one of Supplementary notes 10 to 12, wherein a plurality of I/O devices are prepared for the one logical partition to be migrated, whereby the I/O devices are made redundant.

The invention claimed is:

1. A dynamic migration apparatus of a system that logically divides hardware resources of a physical machine to configure a plurality of logical partitions using a pass-through I/O method, and performs migration on the logical partitions, the dynamic migration apparatus making a setting so that an I/O device used in a migration source logical partition continues to be used in a migration destination logical partition when migration is performed, the dynamic migration apparatus comprising: a management console control unit that accepts an execution instruction for migration after a hardware resource to be the migration destination is reserved on the physical machine by a virtual machine; a configuration control unit that instructs a migration support unit to start migration in response to the acceptance of the execution instruction; and the migration support unit that transfers data of a main memory unit of the migration source to a main memory unit of the migration destination based on the instruction of the configuration control unit, and after the transfer of all the data of the main memory unit of the migration source is completed, suspends arithmetic processing in the migration source, masks a DMA (Direct Memory Access) from a subordinate I/O device, and updates information the configuration control unit has, and after the update, releases the masking and makes the arithmetic processing resumed in the migration destination, the information pertaining to correspondence between the logical partitions and the I/O device.

2. The dynamic migration apparatus according to claim 1, wherein the migration source and the migration destination lie on different physical machines.

3. The dynamic migration apparatus according to claim 1, wherein a plurality of I/O devices are prepared for the one logical partition to be migrated, whereby the I/O devices are made redundant, and
the I/O device used in the migration source logical partition is one of the plurality of I/O devices.

4. A computer system comprising a physical machine and a dynamic migration apparatus according to claim 1, the dynamic migration apparatus being connected to the physical machine,
the dynamic migration apparatus being used to perform the migration.

5. A non-transitory computer-readable medium stored therein a dynamic migration program of a system that logically divides hardware resources of a physical machine to configure a plurality of logical partitions using a pass-through I/O method, and performs migration on the logical partitions, the dynamic migration program making a computer function as a dynamic migration apparatus that makes a setting so that an I/O device used in a migration source logical partition continues to be used in a migration destination logical partition when migration is performed,
wherein the dynamic migration apparatus includes: a management console control unit that accepts an execution instruction for migration after a hardware resource to be the migration destination is reserved on the physical machine by a virtual machine; a configuration control unit that instructs a migration support unit to start migration in response to the acceptance of the execution instruction; and the migration support unit that transfers data of a main memory unit of the migration source to a main memory unit of the migration destination based on the instruction of the configuration control unit, and after the transfer of all the data of the main memory unit of the migration source is completed, suspends arithmetic processing in the migration source, masks a DMA from a subordinate I/O device, and updating information the configuration control unit has, and after the update, releases the masking and makes the arithmetic processing resumed in the migration destination, the information pertaining to correspondence between the logical partitions and the I/O device.

6. The non-transitory computer-readable medium according to claim 5, wherein the migration source and the migration destination lie on different physical machines.

7. The non-transitory computer-readable medium according to claim 5, wherein a plurality of I/O devices are prepared for the one logical partition to be migrated, whereby the I/O devices are made redundant, and the I/O device used in a migration source logical partition is one of the plurality of I/O devices.

8. A dynamic migration method of a system that logically divides hardware resources of a physical machine to configure a plurality of logical partitions using a pass-through I/O method, and performs migration on the logical partitions, the dynamic migration method including making a setting so that an I/O device used in a migration source logical partition continues to be used in a migration destination logical partition when migration is performed, the dynamic migration method comprising: a management console control step of accepting an execution instruction for migration after a hardware resource to be the migration destination is reserved on the physical machine by a virtual machine; a step of preparing a configuration control unit for giving an instruction to start migration in a migration support step in response to the acceptance of the execution instruction; and the migration support step of transferring data of a main memory unit of the migration source to a main memory unit of the migration destination based on the instruction of the configuration control unit, and after the transfer of all the data of the main memory unit of the migration source is completed, suspending arithmetic processing in the migration source, masking a DMA from a subordinate I/O device, and updating information the configuration control unit has, and after the update, releasing the masking and making the arithmetic processing resumed in the migration destination, the information pertaining to correspondence between the logical partitions and the I/O device.

9. The dynamic migration method according to claim 8, wherein the migration source and the migration destination lie on different physical machines.

10. The dynamic migration method according to claim 8, wherein a plurality of I/O devices are prepared for the one logical partition to be migrated, whereby the I/O devices are made redundant, and the I/O device used in the migration source logical partition is one of the plurality of I/O devices.

* * * * *